United States Patent Office 3,303,050
Patented Feb. 7, 1967

3,303,050
TEXTILE MATERIAL COMPRISING AN ACRYLONITRILE POLYMER COATED WITH A TERPOLYMER OF AN ACRYLIC ESTER, A VINYL ESTER AND A CROSS-LINKING MONOMER
Winston J. Roberts, Waynesboro, Va., assignor to E. I. du Pont de Nemours and Company, Wilmington, Del., a corporation of Delaware
No Drawing. Filed June 23, 1965, Ser. No. 466,475
10 Claims. (Cl. 117—138.8)

This application is a continuation-in-part of application Serial No. 325,480, filed November 21, 1963, and now abandoned.

This invention relates to a novel product comprising a synthetic textile coated with a composition which imparts a cashmere-like quality to said textile.

Some natural fibers, especially certain animal fibers such as cashmere, are noted for their soft, smooth, slick feel or "hand." Such fibers are highly prized for use in women's apparel such as sweaters, coats, suits, and skirts. Mohair also has a slick, smooth hand. These are considered premium fibers.

Many efforts have been made to modify synthetic fibers to make them more closely resemble these particular natural fibers. Much of this effort has been along the lines of applying finishes to the fibers or to yarns and fabrics made from these fibers. Some success has been realized with temporary finishes which have to be replaced after each washing or dry-cleaning. Thus, long chain fatty acids or acid chlorides or anhydrides have been reacted with alkanol amines of various types to make a wide range of finishing agents. Salts of long-chain amines or quaternary ammonium bases have likewise been used. But all of these are removed by the first washing.

Many of the finishes used heretofore on fabrics or fibers also increase the tendency of the fibers to retain soils, especially oily soils.

It is therefore an object of the present invention to provide a textile produced from a polymer of acrylonitrile which has a slick, smooth, and soft hand. It is a further object to provide a textile produced from a polymer of acrylonitrile which has a permanent, slick, smooth, and soft hand. It is still a further object to provide a textile produced from a polymer of acrylonitrile which has a slick, smooth, and soft hand without materially increasing the tendency of the textile to retain soil.

These and other objects will become apparent in the course of the following specification and claims.

These objects are accomplished in the present invention by applying to at textile produced from a polymer of acrylonitrile a composition which imparts a cashmere-like hand to said textile, said composition being prepared by copolymerizing a mixture of (A) at least one vinyl monomer containing a cross-linkable group selected from the class consisting of methylol and epoxy groups, (B) at least one monomer of the formula

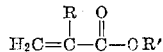

wherein R is a radical selected from the class consisting of hydrogen and methyl, and R' is an alkyl radical of at least eight carbon atoms, and (C) at least one monomer selected from the class consisting of vinyl acetate and vinyl propionate.

Monomers of group (A) are present in the final polymer to the extent of from about 10 mol percent to about 19 mol percent. Group (B) monomers are present in the final polymer to the extent of from about 45 mol percent to about 60 mol percent and preferably from about 48 mol percent to about 56 mol percent. Monomers of group (C) are present in the final polymer to the extent of from about 20 mol percent to about 40 mol percent and preferably from about 24 mol percent to about 30 mol percent.

These polymers may be obtained by direct interpolymerization, i.e., addition polymerization through the vinyl groups of the monomeric compounds. Polymerization is carried out in the presence of a free radical catalyst system which is so selected as to leave the epoxy or methylol radicals unaffected.

By the term "textile produced from a polymer of acrylonitrile" is meant a filament or fiber or the like formed by extrusion of a polymer of acrylonitrile such as is illustrated in U.S. Patent No. 2,436,926 to R. A. Jacobson, dated March 2, 1948, and also yarn, staple, fabric and the like produced therefrom. The term "polymer of acrylonitrile" is intended to include homopolymers and copolymers of acrylonitrile with copolymerizable monomers such as vinyl pyridine, vinylidene chloride, vinyl chloride, methyl methacrylate, other copolymerizable monomers of the type disclosed in Jacobson U.S. Patent No. 2,436,926, and copolymerizable sulfonate monomers such as the vinylarenesulfonate monomers disclosed in Andres et al. U.S. Patent No. 2,837,500. Fibers prepared from polymers containing at least 70 percent acrylonitrile are preferred.

Monomers of group (A) include vinyl methylol and vinyl epoxy compounds. Throughout this application the term "epoxy" will be used to designate groups having the formula:

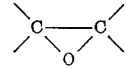

where the carbons joined to the oxygen atom are joined to each other. The term "methylol" will be used to designate the monovalent radical —CH$_2$OH.

The polymers of this invention may be obtained by directed interpolymerization, i.e., addition polymerization through the vinyl groups of the monomeric compounds. Preferably, the polymers of this invention are prepared in an aqueous emulsion from which they can be applied directly to the fiber without first isolating and dissolving or re-emulsifying. Alternatively, solution polymerization procedures may be used. Broadly, the process for preparing the polymers of this invention comprises combining, with agitation, the three tyes of monomeric components denoted above with an emulsifying agent in water to form an aqueous emulsion, adjusting the pH to between about 3 and about 8.5, and preferably between about 5 and about 7, preferably heating the reaction mixture to a temperature of about 40° C., adding a free radical catalyst, and continuing the heating and agitation for a sufficient period to obtain a polymer having an inherent viscosity of at least about 0.4 when measured in *solvent* at 25° C. and preferably between about 0.8 and about 1.2 at the same temperature and solvent. A small amount of the reaction mixture can easily be removed in order to determine the inherent viscosity of the polymer. In practice, it has been observed that a temperature rise of from about 4° C. to about 10° C. over a 10 minute period is indicative of the formation of a polymer suitable for the practice of this invention. The basic emulsion polymerization routine set forth herein is well known to those skilled in the art, and many variations of such process will be apparent.

Suitable emulsifying agents for the polymerization reaction include, for example, sodium lauryl sulfate, glycerol mono-oleate, alkylphenoxypoloxyethylene glycol, and sulfonated castor oil. Obviously, various mixtures of these emulsifiers and wetting agents may be employed in order to obtain suitable stability of the emulsions. The present invention is not limited to the use of any particular proportion of emulsifying agent. In general it is preferred to use from 1 to 5% of the emulsifying agent based on the weight of the monomers to be emulsified, but commercially attractive stable emulsions may be obtained if this figure is varied from 0.1% to 25%. The optimum concentration depends primarily upon the materials to be emulsified although other factors such as agitation have a decided effect.

The use of a suitable catalyst in the preparation of the terpolymer component is usually desirable in the polymerization step in order to obtain a reaction speed which is commercially feasible. The various water-soluble peroxygen compounds are particularly suitable in the practice of this invention as are water-soluble aliphatic azo compounds. For example, the various peroxides, e.g., urea peroxide, hydrogen peroxide, potassium peroxide, sodium peroxide and the like may be used, or azo-bis-isobutyramide hydrochloride. Other suitable catalysts include persulfate, potassium persulfate, sodium perborate, peracetic acid and the like. Still other catalysts such as complex catalysts made from a ferrous or ferric salt and hydrogen peroxide as disclosed in U.S. Patent No. 2,508,341 may be used. It is also possible to employ water-insoluble oxygen-yielding catalysts such as benzoyl peroxide, tertiary butyl hydroperoxide, lauryl peroxide and acryl peroxide, and azo compounds. The concentration of catalysts employed is usually very small, e.g., from about 1 to about 20 parts of catalyst per 1000 parts of the reactive mixture. If an inhibitor be present, up to 5% or even more of the catalyst may be necessary according to the concentration of the inhibitor. It is preferably that a neutral initiator or one operable in the pH range 3 to 9 be used in this type of polymerization in order to prevent the premature opening of the epoxide rings of the epoxy-containing monomer.

A durable, slick, tactile quality is imparted to textiles produced from a polymer of acrylonitrile by a process which comprises treating the fibers with an aqueous dispersion or solvent solution of the polymers of this invention to provide a coating of from about 0.2% to about 7% by weight of the polymer on the fibers. Preferably the polymers are applied to the fibers in solid form a dispersion. The treated fibers are then subjected to a heat treatment at a temperature between 90° and 150° C., and preferably at a temperature between 120° and 150° C., for from 1 to 30 minutes. The heat treatment should be sufficient to bring about cross-linking of the epoxy or methylol groups of the interpolymer which results in a highly durable attachment of the polymer to the fiber. An acid catalyst such as trifluoroacetic acid, sulfuric acid, hydrochloric acid, tartaric acid, p-toluene sulfonic acid, and phosphoric acid, or an acid salt such as zinc chloride, zinc nitrate, ammonium sulfate, and magnesium chloride may be used to accelerate the cross-linking reaction.

Basic catalysts such as tris(dialkylaminoalkyl)phenols can also be used to increase the speed of the cross-linking reaction.

As previously indicated, by coating a textile produced from a polymer of acrylonitrile with an amount from about 0.2% to about 7%, based on the dry weight of the textile, of the polymers of this invention, a cashmere-like quality is imparted to the textile.

The aesthetic qualities of cashmere although subjectively obvious to the touch, are not easily measured by objective, quantitative, physical tests. One test, however, which generally correlates well with subjective impressions of cashmere-like hand is the determination of the yarn-over-yarn static coefficient of friction ($f_s$). This test is performed on a single filament or a group of filaments or a yarn by the method described in Röder in the Journal of the Textile Institute, pages T-247 to T-251, June 1953.

The filament or thread is weighted at one end, wrapped around a rotatable rod completely covered with similar fibers lying parallel to each other and parallel to the rod axis, and thus at right angles to the test specimen. The other end of the test specimen is attached to a strain gauge. By measuring the tension on the test fiber as the rotation of the rod increases from 0.06 to 1.7 cm./sec. (surface speed) over a one minute time interval, a maximum tension or stick-slip point is observed. Thus, the friction at first drops as the speed increases, then levels off until the critical stick-slip stage is reached. The level part of the curve is used for the calculations of the coefficient of friction. The coefficient of static friction ($f_s$) is calculated from the belt formula:

$$\frac{T_2}{T_1}=e^{(f_s)A}$$

where $T_2$ is the average maximum tension, $T_1$ is the initial tension at zero speed, $A$ is the wrap angle in radians, $e$ is the base of natural logarithms 2.718. This equation reduces to the form:

$$f_s=\frac{\ln T_2/T_1}{A}$$

where ln is the symbol for the natural logarithm.

The following examples illustrate the invention. All parts and percentages are by weight unless otherwise indicated.

EXAMPLE I

*Decyl-octyl acrylate/vinyl acetate/glycidyl methacrylate 70/20/10*

An interpolymer is made from a mixture of decyl-octyl acrylate, glycidyl methacrylate, and vinyl acetate by emulsion polymerization according to the following procedure:

To a melt of 12.5 parts "Igepal" CO-880, a tradename for a nonylphenoxy polyethylene glycol having 30 mols (88%) ethylene oxide units sold by General Dyestuffs Corporation, contained in a Waring Blendor mixer, is added with stirring 500.0 parts demineralized water, and the pH adjusted to 6.0. A mixture of 70 parts of a 1:1 mixture of decyl-octyl acrylate, 20 parts vinyl acetate, and 10 parts glycidyl methacrylate is prepared, and added to the blender containing the "Igepal" CO-880. The charge is stirred vigorously for 5 minutes under nitrogen, and then transferred to an acid-scoured glass or stainless steel vessel. The temperature of the charge is raised to 40° C., and 1.0 parts of potassium peroxy-disulfate and 1.0 part of sodium pyrosulfite added with stirring under nitrogen. A temperature rise of 4° to 10° C. over a 10 minute period indicates polymerization. The pH of the charge is maintained at pH 6.0 by addition of 2 N $H_2SO_4$ or 2 N KOH solution as needed.

Two parts of the above composition are diluted with water to 100 parts. A fabric is knitted from 3-denier-per-filament (d.p.f.) fiber spun from a terpolymer consisting of 93.6% acrylonitrile, 6% methyl acrylate and 0.4% sodium styrenesulfonate. A piece of this fabric weighing seven grams is dipped into the diluted dispersion, squeezed out to a wet weight of 15 gms., then oven dried at 140° C. for 30 minutes. The dried fabric has a smooth, slick, and pleasant hand.

Fibers taken from the treated fabric and others taken from an untreated fabric are tested for static friction with the following results:

| | Coefficient of friction |
|---|---|
| Treated fibers | 0.254 |
| Untreated fibers | 0.376 |
| Mohair | 0.283 |

EXAMPLE II

*Decyl-octyl acrylate/vinyl acetate/glycidyl methacrylate 75/15/10*

A polymer is prepared by emulsion polymerization of the following composition:

| | Parts | Percent |
|---|---|---|
| Demineralized water | 1,500.0 | 65.25 |
| "Igepal" CO-880 | 45.0 | 1.96 |
| Decyl-octyl acrylate | 563.0 | 24.50 |
| Glycidyl methacrylate | 75.0 | 3.26 |
| Vinyl acetate | 112.5 | 4.90 |
| $K_2S_2O_8$ | 1.5 | .065 |
| $Na_2S_2O_5$ | 1.5 | .065 |
| | 2,298.5 | 100.00 |

These materials are mixed and polymerized as in Example I. The temperature rises to 47° C., conversion is 99.7%, and 99.0% of the polymer is water insoluble.

This concentrated finish is diluted with water to 3% solids and applied to a 470,000-denier tow of 8.5-denier-per-filament acid dyeable fiber made by copolymerizing acrylonitrile and vinyl pyridine according to U.S. 2,640,049. The finish is applied at the rate of 3 parts of the diluted finish to 100 parts of the wet drawn tow (on dry basis). The treated fibers are soft and slick with a cashmere-like hand.

EXAMPLE III

*Stearyl methacrylate/vinyl acetate/glycidyl methacrylate 80/10/10*

A terpolymer is made using stearyl methacrylate, vinyl acetate, and glycidyl methacrylate in the ratio of 80/10/10 parts by weight. These are copolymerized in the following composition:

| | Parts | Percent |
|---|---|---|
| Demineralized water | 1,866.0 | 68.15 |
| "Igepal" CO-880 | 40.0 | 1.44 |
| Sodium lauryl sulfate | 20.0 | 0.72 |
| Glyceryl mono-oleate | 4.0 | 0.15 |
| Stearyl methacrylate | 640.0 | 23.40 |
| Vinyl acetate | 80.0 | 2.92 |
| Glycidyl methacrylate | 80.0 | 2.92 |
| $K_2S_2O_8$ | 4.0 | 0.15 |
| $Na_2S_2O_5$ | 4.0 | 0.15 |
| | 2,738.0 | 100.00 |

The following procedure is employed.

The sodium lauryl sulfate is added to the demineralized water with stirring. Melted "Igepal" and glycerol mono-oleate is mixed and added to the sodium lauryl sulfate solution. The stearyl methacrylate, glycidyl methacrylate, and vinyl acetate are premixed and added to the above solution using a high speed blender to emulsify the monomers.

The emulsion is transferred to a stainless steel reactor, swept out with nitrogen, and heated under nitrogen at 40° C. while continuing to stir. The potassium peroxydisulfate and the sodium pyrosulfite are added, the pH adjusted to 6.0 with 2 N KOH, and the heating continued at 40° C. for five hours.

This yields a polymer which is 97.9% insoluble in water. The conversion is 97.7% based on starting monomers. When applied to knit fabrics of acrylonitrile a smooth, pleasant feel is imparted to the fabric. A piece of the treated fabric, along an untreated fabric, is washed together five times in a home-type washing machine. After rinsing and drying, the treated fabric is still soft and slick as compared to the untreated fabric.

EXAMPLE IV

*50/25/15/10 interpolymer of decyl-octyl acrylate, stearyl methacrylate, vinyl acetate and glycidyl methacrylate*

These monomers are emulsified and polymerized as in Example III in the following composition:

| | Parts | Percent |
|---|---|---|
| Demineralized water | 1,866.0 | 68.15 |
| "Igepal" CO-880 | 40.0 | 1.44 |
| Sodium lauryl sulfate | 20.0 | 0.72 |
| Glyceryl mono-oleate | 4.0 | 0.15 |
| Decyl-octyl acrylate | 427.0 | 15.60 |
| Stearyl methacrylate | 213.0 | 7.80 |
| Vinyl acetate | 80.0 | 2.92 |
| Glycidyl methacrylate | 80.0 | 2.92 |
| $K_2S_2O_8$ | 4.0 | 0.15 |
| $Na_2S_2O_5$ | 4.0 | 0.15 |
| | 2,738.0 | 100.00 |

Water is added to 2000 gm. of this interpolymer dispersion to give 100,000 gm. of dilute dispersion. This dispersion is applied to a 470,000-denier tow of 6-denier-per-filament fiber of a terpolymer of acrylonitrile/methyl acrylate/sodium styrenesulfonate of 93.6/6/0.4 parts, respectively. The tow is cut into staple and dried, then heated 15 minutes at 140° C. to cross-link the finish. This staple is carded and spun on the cotton system to 20-cotton count warn having 11 Z twist. Two of these yarns are plied and twisted 5.5 turns S twist. The plied yarn is then knit into fabric with a jersey stitch. After washing and drying, this fabric has a pleasant soft, slick hand and this hand is retained through five washings.

EXAMPLE V

The following mixture of monomers was prepared:

| | Parts |
|---|---|
| N-methylolacrylamide | 10.00 |
| Octyl acrylate | 17.50 |
| Decyl acrylate | 17.50 |
| Stearyl methacrylate | 35.00 |
| Vinyl acetate | 20.00 |

One part of glyceryl mono-oleate and 25 parts nonylphenoxy polyethylene glycol

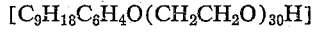
$$[C_9H_{18}C_6H_4O(CH_2CH_2O)_{30}H]$$

are added to 1500 parts of water in a vessel with a high mixer. With the mixer running at moderate speed, the monomer mixture from above is added. The stirrer is then run for 20 minutes at high speed. A stable, milky emulsion is thus obtained. The emulsion is transferred to a stainless steel vessel equipped with heating coils and a stirrer. The air is displaced with nitrogen, and 0.3% potassium persulfate and 0.1% sodium bisulfite, each based on the monomer weight, are added to the emulsion. The temperature is raised to 40° C.±5° C., and held for four hours to complete polymerization.

Two parts deionized water are added to 1 part of the polymer dispersion to give a dispersion containing 2% solids. This diluted dispersion is used in treating a 3-denier-per-filament tow spun from a terpolymer of acrylonitrile/methyl acrylate/sodium styrenesulfonate of 93.6/6/0.4 parts, respectively. The tow is cut into 1.1 inch staple, dried, and heated to 130° C. for twenty minutes to cross-link the interpolymer through the methylol groups. The staple is then carded on a woolen card to give a sliver weighing 250 grains per yard (17.7 gm. per meter).

This sliver is used for sliver-knitting a fabric on a Wildman high pile knitting machine using, for the backing of the pile fabric, a two ply yarn consisting of one ply of high shrinkage yarn spun from a co-polymer of acrylonitrile and vinyl chloride of 15/1 cc.; and one ply of cotton yarn of 20/1 cc. The knit backing fabric construction is 24 courses per inch and 13.5 wales per inch, and the final fabric weighs 19.7 ounces per square yard (658 gms. per square meter). The pile height after shearing is ⅜ inch. The pile has a soft, luxuriant feel with the smoothness and slickness of a natural fur.

EXAMPLE VI

A dispersion of the following composition is prepared by methods described in the previous examples:

|  | Parts | Percent |
|---|---|---|
| Metal-free water | 467.0 | 68.2 |
| "Igepal" CO-880 | 10.0 | 1.42 |
| Sodium lauryl sulfate | 5.0 | 0.73 |
| Glyceryl mono-oleate | 1.0 | 0.15 |
| Decyl-octyl acrylate | 70.0 | 10.1 |
| Stearyl methacrylate | 70.0 | 10.1 |
| Vinyl acetate | 40.0 | 6.0 |
| Glycidyl methacrylate | 20.0 | 3.0 |
| Na₂S₂O₅ | 1.0 | 0.15 |
| K₂S₂O₈ | 1.0 | 0.15 |
| Ferrous ammonium sulfate | Trace |  |
|  |  | 100.00 |

This polymer is applied to a tow of 4.0-denier fiber spun from a copolymer of 96 parts acrylonitrile and 4 parts sodium styrenesulfonate. The amount of polymer applied to the fiber on a dry basis is 1%. The fiber is passed through a stuffer box crimper, then cut into 1⅛-inch staple. This staple is carded and converted to a sliver which in turn is used to sliver-knit a pile fabric on a Wildman knitting machine. The knit fabric is sheared, then hot combed to straighten the pile hairs, after which it is again sheared leaving a ⅜" pile height. This fabric is soft and slick, closely resembling a natural fur in feel.

EXAMPLE VII

In the following terpolymer the decyl-octyl methacrylate is completely replaced by stearyl methacrylate.

|  | Parts | Percent |
|---|---|---|
| Metal-free water | 467.0 | 68.20 |
| "Igepal" CO-880 | 10.0 | 1.42 |
| Sodium lauryl sulfate | 5.0 | .73 |
| Glyceryl mono-oleate | 1.0 | 0.15 |
| Stearyl methacrylate | 140.0 | 20.20 |
| Vinyl acetate | 40.0 | 6.00 |
| Glycidyl methacrylate | 20.0 | 3.00 |
| Na₂S₂O₅ | 1.0 | 0.15 |
| K₂S₂O₈ | 1.0 | 0.15 |
| Ferrous ammonium sulfate | Trace |  |
|  |  | 100.00 |

This composition is polymerized and the resulting dispersion is diluted with demineralized water to 2% solids concentration. The dilute dispersion is applied to a 470,000-denier tow of 6-denier fiber spun from a terpolymer of 93.6% acrylonitrile, 6% methyl acrylate and 0.4% sodium styrenesulfonate. After drying, the coefficient of friction of the fiber is determined by methods discussed above. The value of the coefficient of friction is 0.249. Untreated fibers have a coefficient of friction of 0.376.

EXAMPLE VIII

*Stearyl methacrylate/vinyl acetate/glycidyl methacrylate 70/20/10*

An interpolymer is made from a mixture of stearyl methacrylate, vinyl acetate, and glycidyl methacrylate by emulsion polymerization according to the following procedure.

To a stirred mixture of 700 parts demineralized water and 9 parts sodium lauryl sulfate are added 204 parts stearyl methacrylate, 58 parts vinyl acetate, and 29 parts glycidyl methacrylate. The monomers may be premixed before addition to the aqueous phase. The mixture is emulsified by high speed agitation in a Waring Blendor mixer for 5 minutes under an inert atmosphere. The charge is transferred to an inert atmosphere-blanketed acid-scoured glass or stainless steel vessel. The charge is moderately agitated and adjusted to a pH of 7.0. The temperature of the mixture is raised to 65° C. and 1.45 parts of azo-bis-isobutyronitrile (as a 30% solution in acetone) is added. An example of an alternate water soluble catalyst which may be used is an equal amount of azo-bis-isobutyramidine hydrochloride. After a reaction period of 6 hours at 65° C., the temperature of the charge is reduced to room temperature.

This procdure yields a polymer which is 99% insoluble in water; conversion is 98–100% based on starting monomers. The concentrated emulsion is diluted with demineralized water and applied to fibers or fabrics as in other examples of the case. A soft, slick hand is imparted to the treated fibers.

Each of the monomers contributes some particular property to the final polymer as will be more fully explained later.

The epoxy-containing vinyl monomers useful in preparing the interpolymers of this invention may be represented by the formula:

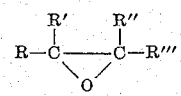

wherein the radical R contains at least one polymerizable vinyl group; R', R" and R'" are selected from the group consisting of hydrogen, alkyl, and aryl; and the groups R, R', R", and R'", or at least two of them, may be joined in such a way that, with one or both of the epoxy carbons, they form a complete ring.

Examples of suitable epoxide-containing vinyl monomers are: allyl glycidyl ether; butadiene monoepoxide; vinyl-2,3-epoxybutyrate; 4-vinyl cyclohexene oxide; glycidyl acrylate; vinyl-9,10-epoxy stearate; allyl-9,10-epoxy stearate; 1,2-epoxy-3-(2-allylphenoxy) propane; allyl-10,11-epoxy-undecanoate; dicyclopentadiene monoxide; and similar vinyl- and epoxy-containing compounds.

Active methylol groups are provided in the polymers of this invention by including as one of the monomers in the interpolymerization reaction a vinyl monomer containing an active methylol group, e.g., one activated by a carbonyl, thiocarbonyl, oxime or similar groups.

Among the suitable monomers containing active methylol groups are N-methylolmaleimide; N-methylolacrylamide; N-methylol-N-vinyl piperazine; N-methylol-N-vinyl melamines; N-methylolated acrylo- and methacryloguanamine, N-methylolated derivatives of urea, e.g., thiourea and guanidine containing vinyl groups; and α-methylolated alkyl vinyl ketones.

The preferred monomers of group (A) are glycidyl methacrylate, glycidyl acrylate, allyl glycidyl ether, and N-methylolacrylamide. Most preferred yet are glycidyl methacrylate and N-methylolacrylamide.

The purpose of the monomer having a vinyl group and either an epoxy group or a methylol group is to crosslink the polymer after it is applied to the fiber. The primary polymer is made by interpolymerizing the vinyl groups, i.e., the carbon double bonds, in each monomer leaving the epoxy or methylol groups intact. After the polymer is applied to the fiber, the polymer is cross-linked by means of the epoxy or methylol groups.

Examples of satisfactory monomers of type (B) are acrylates or methacrylates of aliphatic alcohols of 8 to 22 carbon atoms such as octyl acrylate or methacrylate, decyl acrylate or methacrylate, dodecyl acrylate or methacrylate, tetradecyl acrylate or methacrylate, hexadecyl acrylate or methacrylate, and octadecyl acrylate or methacrylate, The purpose of this ingredient, having a long alkyl chain, is to lubricate and soften the finish to give a smooth, slick hand to the fibers.

The third class of monomer, type (C), consists of a vinyl ester of a short chain fatty acid chosen from the group acetic and propionic acids. Vinyl acetate is the preferred monomer of this class.

The purpose of this class of monomer is to provide soil resistance in the finish. The vinyl ester groups are resistant to oily soils and the presence of the ester groups make the polymer sufficiently water sensitive and oil insensitive so that soils are easily removed by washing. The water sensitivity of the final polymer can be increased by hydrolyzing or partially hydrolyzing the ester groups to give hydroxyl groups. This hydrolysis can be carried out readily using mild alkalies such as sodium carbonate or dilute sodium hydroxide solutions at temperatures of 60° to 100° C. The presence of the hydroxyl groups enhances the soil resistance as well as the ease of soil removal.

More than one polymer from each class may be used. From the group (B) there may be used a mixture of octyl and decyl methacrylates. In fact this mixture is preferred for the monomers supplying the long chain alkyl groups. A mixture of octyl and stearyl acrylates or methacrylates can likewise be used, or a mixture of acrylates and methacrylates or crotonates.

It is also permissible to use more than one epoxy-containing monomer, or more than one methylol-containing monomer. A mixture of vinyl acetate and vinyl propionate can be used, but vinyl acetate alone is preferred.

As previously indicated, the interpolymer of the present invention may be utilized in the preparation of fiber and fiber structures such as yarns, tows, roving, and knitted, woven and unwoven textiles produced from a polymer of acrylonitrile to impart a cashmere-like quality to such structures. Added cashmere-like quality in such textiles can be obtained by applying the interpolymers of this invention to essentially straight fibers which are incorporated into spun yarn structures. They may be applied to the fiber structures from dispersions or solutions, dispersions being preferred.

The primary advantage of the present invention resides in providing a low-cost vinyl interpolymer capable of imparting cashmere-like qualities to synthetic textile fibers. Most textile softening and slickening agents greatly increase the soiling tendency of fabrics. For finishes of this invention, the increase in soiling tendency is so small as to be negligible. In addition, fibers treated with the interpolymers of this invention retain their aesthetic qualities after normal use, laundering, and dry cleaning.

It will be apparent that many widely different embodiments of this invention may be made without departing from the spirit and scope thereof, and therefore it is not intended to be limited except as indicated in the appended claims.

What is claimed is:

1. A synthetic material comprising a textile produced from a polymer of acrylonitrile and a composition coated and cross-linked therein which imparts a cashmere-like hand to said textile, said composition being prepared by copolymerizing a mixture of (A) at least one vinyl monomer containing a cross-linkable group selected from the class consisting of methylol and epoxy groups, (B) at least one monomer of the formula

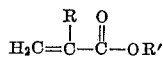

wherein R is a radical selected from the class consisting of hydrogen and methyl, and R' is an alkyl radical of at least eight carbon atoms, and (C) at least one monomer selected from the class consisting of vinyl acetate and vinyl proprionate, wherein the final polymer after polymerization (A) is present in an amount of about 10 mol percent to 19 mol percent, (B) is present in an amount of about 5 mol percent to 60 mol percent, and (C) is present in an amount of about 20 mol percent to 30 mol percent.

2. The synthetic material of claim 1 wherein (A) is glycidyl methacrylate.

3. The synthetic material of claim 1 wherein (A) is N-methylolacrylamide.

4. The synthetic material of claim 1 wherein (B) is about a 1:1 mixture of octyl and decyl methacrylate.

5. The synthetic material of claim 1 wherein (C) is vinyl acetate.

6. A synthetic material comprising a textile produced from a polymer of acrylonitrile having coated and cross-linked thereon a composition which imparts a cashmere-like hand to said textile, said composition being prepared by copolymerizing a mixture of (A) glycidyl methacrylate, (B) about a 1:1 mixture of octyl and decyl methacrylate, and (C) vinyl acetate, wherein the final polymer after polymerization (A) is present in an amount of about 10 mol percent to 19 mol percent, (B) is present in an amount of about 45 mol percent to 60 mol percent, and (C) is present in an amount of about 20 mol percent to 30 mol percent.

7. A synthetic material of claim 6 wherein (B) is stearyl methacrylate.

8. A synthetic material comprising a textile produced from a polymer of acrylonitrile having coated and cross-linked thereon a composition which imparts a cashmere-like hand to a said textile, said composition being prepared by copolymerizing a mixture of (A) N-methylolacrylamide, (B) about a 1:1 mixture of octyl and decyl methacrylate, and (C) vinyl acetate, wherein the final polymer after polymerization (A) is present in an amount of about 10 mol percent to 19 mol percent, (B) is present in an amount of about 45 mol percent to 60 mol percent, and (C) is present in an amount of about 20 mol percent to 30 mol percent.

9. A method for imparting a cashmere-like hand to a textile produced from a polymer of acrylonitrile which comprises applying to said textile from about 0.2% to about 7% of a composition prepared by copolymerizing a mixture of (A) at least one vinyl monomer containing a cross-linkable group selected from the class consisting of methylol and epoxy groups, (B) at least one monomer of the formula

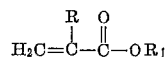

wherein R is a radical selected from the class consisting of hydrogen and methyl, and R' is an alkyl radical of at least eight carbon atoms, and (C) at least one monomer selected from the class consisting of vinyl acetate and vinyl propionate, wherein the final polymer after polymerization (A) is present in an amount of about 10 mol percent to 19 mol percent, (B) is present in an amount of about 45 mol percent to 60 mol percent, and (C) is present in an amount of about 20 mol percent to 30 mol percent and heating said textile to a temperature of about 90° to 150°.

10. A synthetic material as defined in claim 1 where said textile has a yarn-over-yarn static coefficient of friction of no more than 0.26.

References Cited by the Examiner

UNITED STATES PATENTS

| | | | |
|---|---|---|---|
| 2,680,110 | 6/1954 | Loughran et al. | 260—80.5 |
| 2,903,881 | 9/1959 | Schroeder | 117—138.8 |
| 3,025,181 | 3/1962 | Nuessle et al. | 260—80.5 |
| 3,081,197 | 3/1963 | Adelman | 260—80.5 |
| 3,117,108 | 1/1964 | Calvete | 260—80.5 |
| 3,143,437 | 8/1964 | Rosset | 117—138.8 |
| 3,189,581 | 6/1965 | Hart et al. | 260—80.5 |
| 3,223,670 | 12/1965 | Cantor et al. | 260—80.5 |

JOSEPH L. SCHOFER, *Primary Examiner.*

W. HOOVER, *Assistant Examiner.*